United States Patent
Tanaka et al.

(10) Patent No.: US 7,465,339 B2
(45) Date of Patent: Dec. 16, 2008

(54) AIR PURIFIER

(75) Inventors: Toshio Tanaka, Osaka (JP); Kanji Motegi, Osaka (JP); Kenkichi Kagawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 402 days.

(21) Appl. No.: 10/569,610

(22) PCT Filed: Jun. 24, 2005

(86) PCT No.: PCT/JP2005/011616

§ 371 (c)(1),
(2), (4) Date: Feb. 24, 2006

(87) PCT Pub. No.: WO2006/003846

PCT Pub. Date: Jan. 12, 2006

(65) Prior Publication Data

US 2008/0163754 A1    Jul. 10, 2008

(30) Foreign Application Priority Data

Jul. 2, 2004    (JP)    ............................. 2004-197200

(51) Int. Cl.
*B03C 3/016* (2006.01)

(52) U.S. Cl. .................. 96/52; 95/58; 95/70; 96/55; 96/74; 422/186.04

(58) Field of Classification Search .............. 96/52, 96/55, 62, 63, 74; 95/58, 70; 422/186.04
See application file for complete search history.

(56) References Cited

U.S. PATENT DOCUMENTS

| | | | | |
|---|---|---|---|---|
| 5,034,032 | A | * | 7/1991 | Yikai et al. .................. 96/55 |
| 5,433,772 | A | * | 7/1995 | Sikora ........................ 96/87 |
| 6,092,387 | A | * | 7/2000 | Hironaka et al. ............ 62/317 |
| 6,375,714 | B1 | * | 4/2002 | Rump et al. .................. 95/3 |
| 6,508,982 | B1 | * | 1/2003 | Shoji ........................ 422/22 |
| 7,270,698 | B2 | * | 9/2007 | Tanaka et al. ............... 96/95 |
| 7,332,020 | B2 | * | 2/2008 | Tanaka et al. ............... 96/66 |
| 2002/0008480 | A1 | * | 1/2002 | Yamazaki et al. ...... 315/111.21 |
| 2004/0118276 | A1 | * | 6/2004 | Kim ............................. 95/8 |
| 2004/0118285 | A1 | * | 6/2004 | Kim et al. .................... 96/55 |

FOREIGN PATENT DOCUMENTS

| | | |
|---|---|---|
| JP | 4-29766 A | 1/1992 |
| JP | 8-155249 A | 6/1996 |
| JP | 9-869 A | 1/1997 |
| JP | 2002-336689 A | 11/2002 |

* cited by examiner

*Primary Examiner*—Richard L Chiesa
(74) *Attorney, Agent, or Firm*—Birch, Stewart, Kolasch & Birch, LLP

(57) ABSTRACT

In an air purifier including a streamer discharge part (40) generating plasma by streamer discharge, a catalytic part (34) promoting the treatment of air using active species contained in the plasma and a dust collecting part (33) collecting dust in the air, the streamer discharge part (40), the dust collecting part (33) and the catalytic part (34) are arranged in sequence from the upstream side of the air flow to allow the entire face of the catalytic part (34) to effectively work and also permit the elimination of fungi and the inactivation of allergens in a dust collecting part (33).

2 Claims, 3 Drawing Sheets

(A)

(B)

AIR PURIFIER

This application is a National Stage application of PCT International Application No. PCT/JP2005/011616 filed on Jun. 24, 2005, which designated the United States, the entire contents of which are hereby incorporated by reference.

TECHNICAL FIELD

The present invention relates to an air purifier, and more particularly relates to an air purifier including a streamer discharge part that generates plasma by streamer discharge, a catalytic part that promotes the treatment of air using active species contained in the plasma and a dust collecting part that collects dust in the air.

BACKGROUND ART

There has been conventionally suggested an air purifier including a streamer discharge part that generates plasma by streamer discharge, a catalytic part that promotes the treatment of odorous components and hazardous components in the air using the plasma and a dust collecting part that collects dust in the air (see, for example, Patent Document 1).

In the air purifier of this Patent Document 1, the streamer discharge part is composed of discharge electrodes and counter electrodes. The streamer discharge part is disposed in an air passageway of the air purifier, and the catalytic part is disposed, for example, downstream of the streamer discharge part along the air flow. Furthermore, in the air purifier, a dust collecting filter (dust collecting part) is disposed upstream of the streamer discharge part. This permits the collection of dust, fungi, allergens, and the like in the air.

Patent Document 1: Japanese Unexamined Patent Publication No. 2002-336689

DISCLOSURE OF INVENTION

Problems that the Invention is to Solve

In the air purifier of Patent Document 1, active species are generated in a streamer discharge area. A region in which active species are generated is localized in the vicinity of the discharge area, and the active species reach a catalytic part without sufficiently diffusing into the air with the air flow. As a result, the entire face of the catalytic part does not effectively work, leading to unsatisfactory performance.

Since in the air purifier of Patent Document 1 the dust collecting filter is disposed upstream of the streamer discharge part, fungi captured by this dust collecting filter may grow and allergens may retain their activities. Therefore, fungi and allergens may also scatter into the air during maintenance, such as the replacement of the filter.

The present invention has been made in view of the above problems, and an object of the present invention is to allow the entire face of a catalytic part to effectively work and also permit the elimination of fungi and the inactivation of allergens in a dust collecting part.

Means of Solving the Problems

In the present invention, a dust collection part (33) is disposed between a streamer discharge part (40) and a catalytic part (34), and the dust collecting part (33) is an electrical dust collecting member.

More specifically, a first aspect of the present invention is predicated on an air purifier comprising a streamer discharge part (40) generating plasma by streamer discharge, a catalytic part (34) promoting the treatment of air using active species contained in the plasma and a dust collecting part (33) collecting dust in the air. The catalytic part (34) herein is represented by not only a substance that promotes the treatment of air by enhancing the activity of the active species but also an adsorbent (for example, zeolite) that adsorbs odorous components and hazardous components in the air and thus functions as a reaction field of active species to promote the treatment of air.

This air purifier is characterized in that the streamer discharge part (40), the dust collecting part (33) and the catalytic part (34) are arranged in sequence from the upstream side of the air flow, and the dust collecting part (33) is formed of an electrical dust collecting member.

According to the first aspect of the present invention, the air to be treated by the air purifier passes through the streamer discharge part (40), the dust collecting part (33) and the catalytic part (34) in this order. Active species contained in plasma generated by the streamer discharge part (40) pass through the dust collecting part (33) with the air flow and then reach the catalytic part (34). Since in the present invention the dust collecting part (33) is disposed between the streamer discharge part (40) and the catalytic part (34), the active species sufficiently diffuse into the air in the passage of air through the dust collecting part (33).

Furthermore, dust in the air is ionized in the passage of air through the streamer discharge part (40), and the ionized dust is collected by an electrical dust collecting member (33) representing the dust collecting part.

A second aspect of the present invention is characterized in that, in the air purifier of the first aspect of the present invention, the dust collecting part (33) is formed of an electrostatic filter.

According to the second aspect of the present invention, dust in the air is ionized in the passage of air through the streamer discharge part (40), and the ionized dust is collected by the electrostatic filter (33).

EFFECTS OF THE INVENTION

According to the first aspect of the present invention, a streamer discharge part (40), a dust collecting part (33) and a catalytic part (34) are arranged in sequence from the upstream side of the air flow. Therefore, active species contained in plasma generated by the streamer discharge part (40) sufficiently diffuse into the air with the air flow in the passage of the active species through the dust collecting part (33) and then reach the catalytic part (34). In view of the above, the entire face of the catalytic part (34) effectively works, resulting in the achieved satisfactory performance.

Since the elimination of fungi and the inactivation of allergens are carried out in the passage of active species through the dust collecting part (33), this does not cause the problem that fungi and allergens may scatter into the air during maintenance, such as the replacement of a filter. Furthermore, since dust in the air is removed immediately before the catalytic part (34), this can certainly prevent the catalytic activity from being deteriorated due to the adhesion of dust to the catalytic part (34).

Since in this invention an electrical dust collecting member is used as the dust collecting part (33), a high dust collecting effect can be provided by utilizing the ionization of dust using the streamer discharge part (40). Furthermore, since the streamer discharge part (40) is utilized as a discharge part for electrical dust collection, an air purifier combining an air purifying function using plasma with an air purifying function using electrical dust collection can be made compact.

According to the second aspect of the present invention, an electrostatic filter is used as the dust collecting part (33). Like the first aspect of the present invention, a high dust collecting effect can be provided by utilizing the ionization of dust using the streamer discharge part (40). Furthermore, since the streamer discharge part (40) is utilized as a discharge part for electrical dust collection, an air purifier combining an air purifying function using plasma with an air purifying function using electrical dust collection can be made compact.

BRIEF DESCRIPTION OF DRAWINGS

FIG. 1 is an exploded perspective view illustrating an air purifier according to an embodiment of the present invention.

FIG. 2 is a diagram illustrating the interior of the air purifier according to the embodiment when viewed from above.

FIG. 3(A) is an enlarged view illustrating an electrode structure of the principal part of a discharge device, and FIG. 3(B) is a horizontal sectional view of the discharge device.

Figure 1:
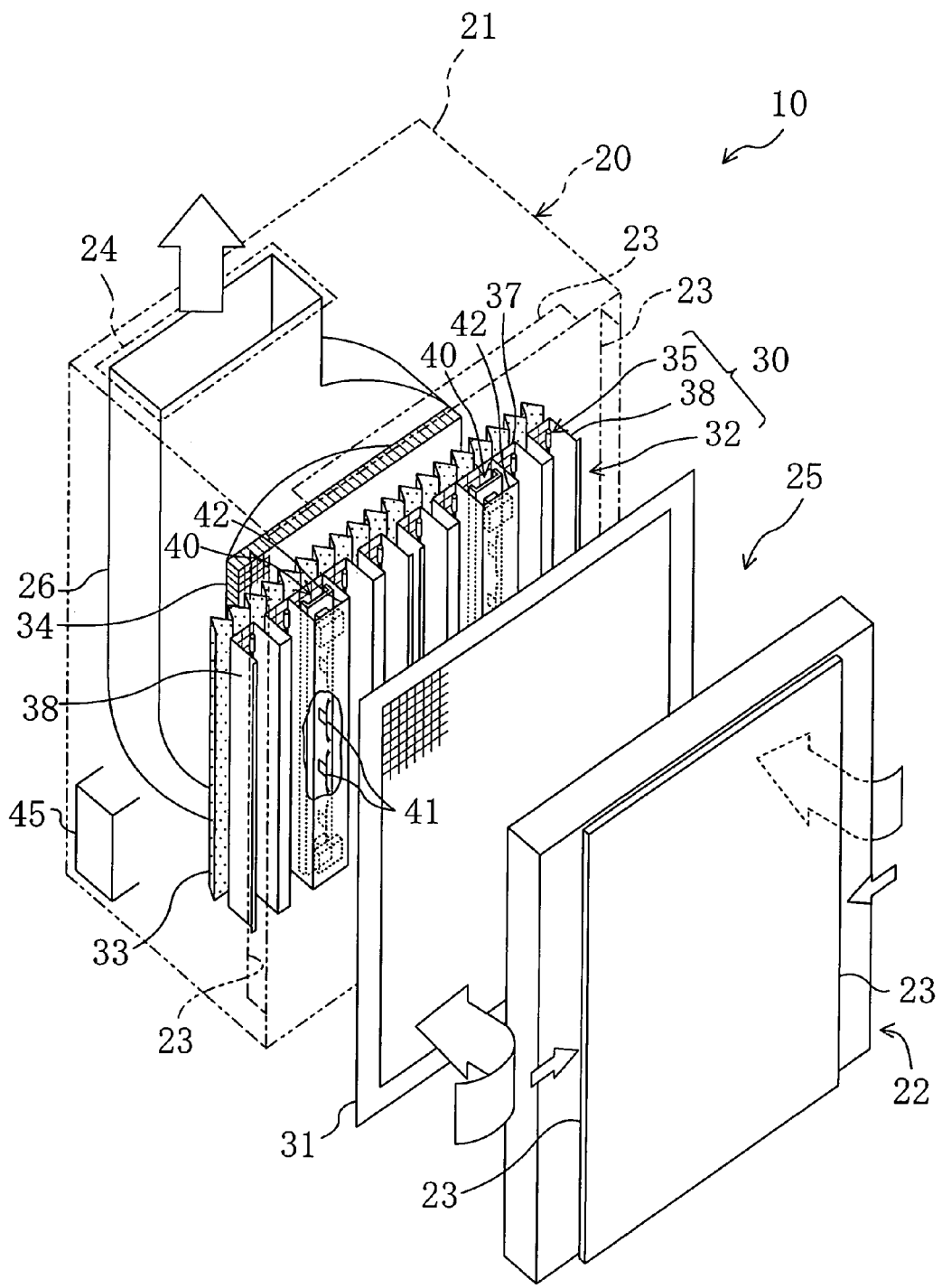
[FIG. 1]

Description of Numerals 10 air purifier
20 casing
30 functional components
31 prefilter
32 ionization part
33 electrostatic filter (dust collecting part)
34 catalytic filter (catalytic part)
40 discharge device (streamer discharge part)
41 discharge electrodes
42 counter electrodes

BEST MODE FOR CARRYING OUT THE INVENTION

An embodiment of the present invention will be more particularly described hereinafter with reference to the drawings.

Figure 2:
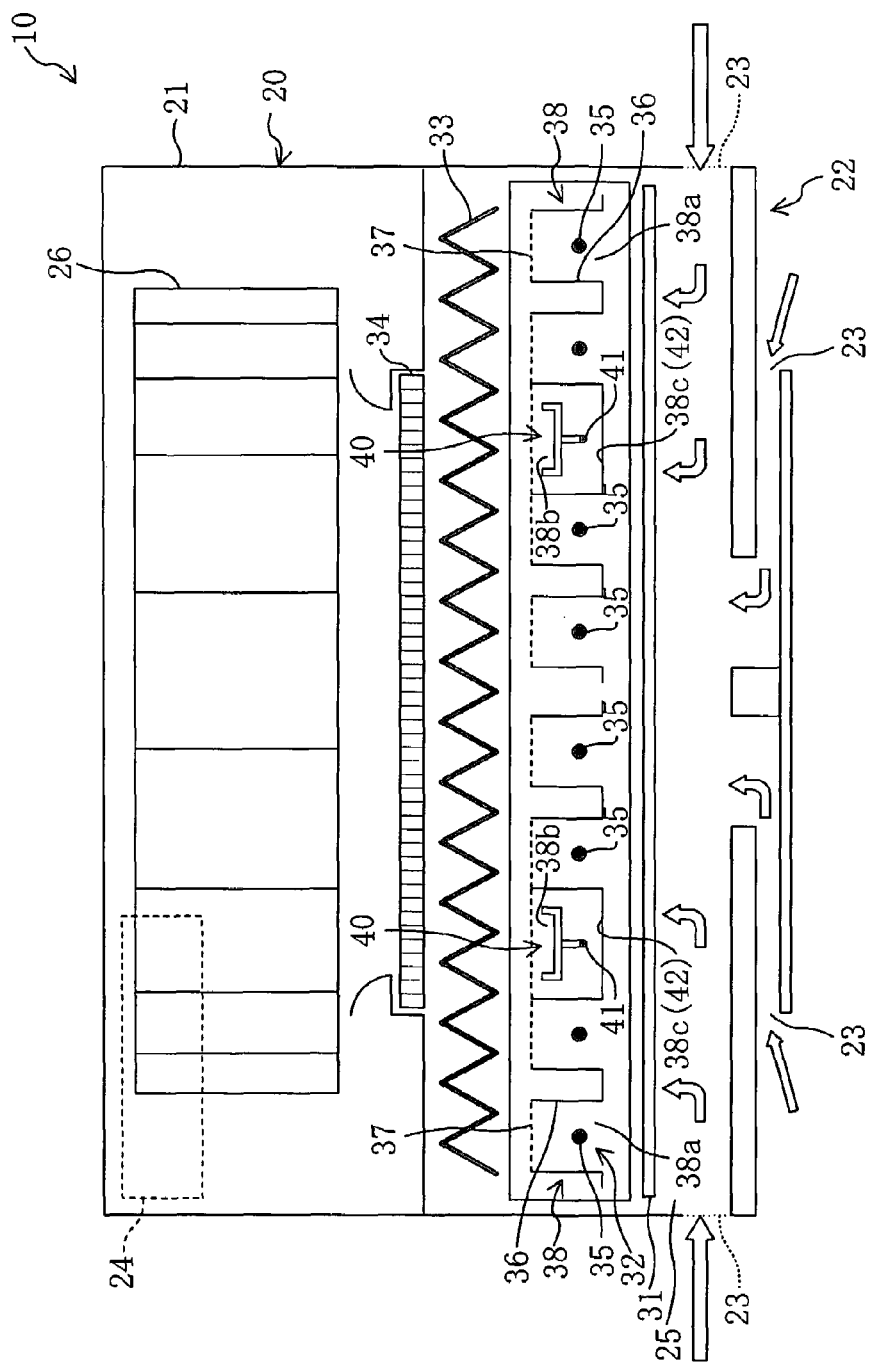
[FIG. 2]

FIG. 1 is an exploded perspective view illustrating an air purifier (10) according to the embodiment, and FIG. 2 is a diagram illustrating the interior of the air purifier (10) when viewed from above. This air purifier (10) is for consumer use in ordinary homes, small stores or the like.

The air purifier (10) includes a casing (20) made up of a box-like casing body (21) one end of which is opened and a front plate (22) mounted to the open end of the casing body (21). Air suction openings (23) through which room air representing a gas to be treated is introduced into the air purifier (10) are formed at the side and top surfaces of the casing body (21) and the front middle portion of the front plate (22). Furthermore, an air blowout opening (24) from which room air flows out is formed in an area of the top plate of the casing body (21) close to the back plate.

Formed within the casing body (21) is an air passageway (25) through which room air flows from the air suction openings (23) to the air blowout opening (24). Arranged, in sequence from the upstream side of the flow of room air (lower side in FIG. 2), along the air passageway (25) are various functional components (30) for air purification, and a centrifugal air blower (26) for distribution of room air through the air passageway (25).

The functional components (30) include a pre-filter (31), an ionization part (32), a discharge device (streamer discharge part) (40), an electrostatic filter (dust collecting part) (33) serving as an electrical dust collecting member, and a catalytic filter (catalytic part) (34) arranged in this order from the closest to the front plate (22). A power source (45) for the discharge device (40) is provided in a lower back part of the casing body (21) of the air purifier (10).

The prefilter (31) collects relatively large dust in the room air. The ionization part (32) electrifies relatively small dust which has passed through the prefilter (31). The electrified dust is collected by the electrostatic filter (dust collecting filter) (33) placed at the downstream of the ionization part (32). The ionization part (32) is made of two or more ionization wires (35) and counter electrodes (36) corresponding to the ionization wires (35).

The ionization wires (35) are arranged in front of a corrugated member (38) which is in a corrugated configuration or in connected substantially U shapes when viewed in horizontal section. In the present embodiment, two corrugated members (38) are arranged from side to side. Each of the corrugated members (38) is formed with a plurality of front open areas (38a) and the ionization wires (35) are arranged in the front open areas (38a), respectively, to extend from the upper end to the lower end of the corrugated member (38). The counter electrodes (36) corresponding to the ionization wires (35) are formed by parts of the corrugated members (38) serving as the walls defining the front open areas (38a). Mesh plates (37) are attached to rearward surfaces of the corrugated members (38) so that they are parallel to the electrostatic filter (33).

The discharge device (40) includes two or more discharge electrodes (41) and flat counter electrodes (42) opposed to the discharge electrodes (41), respectively.

Figure 3:
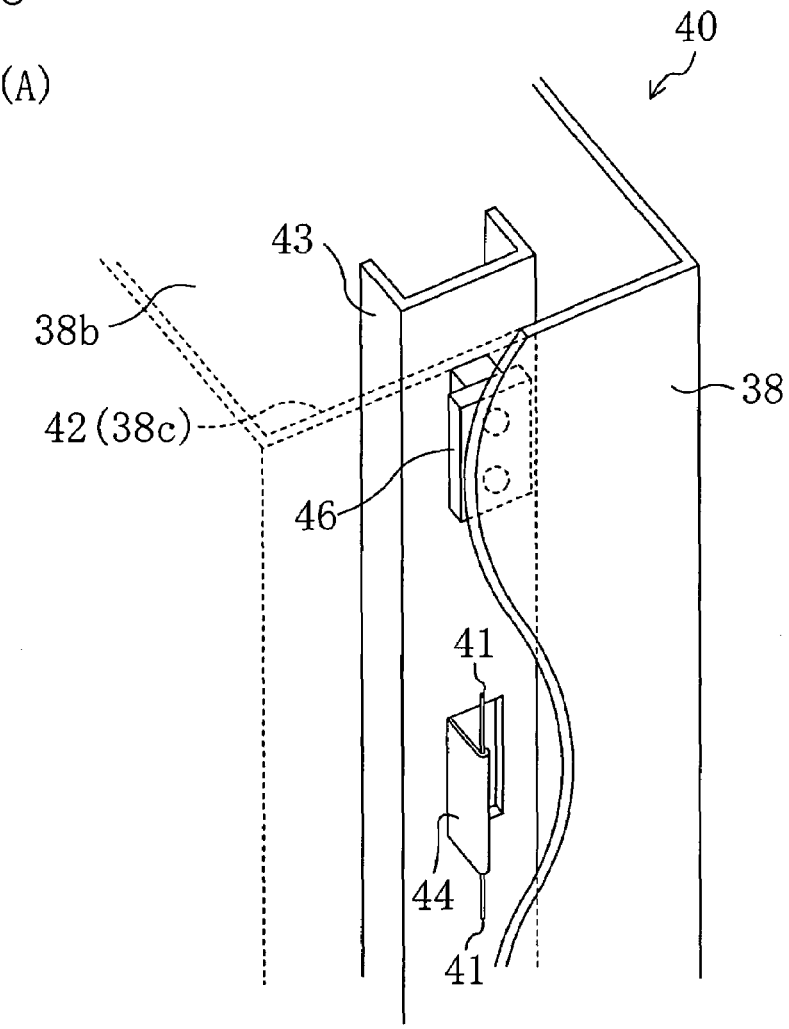
[FIG. 3]
Figure 3:
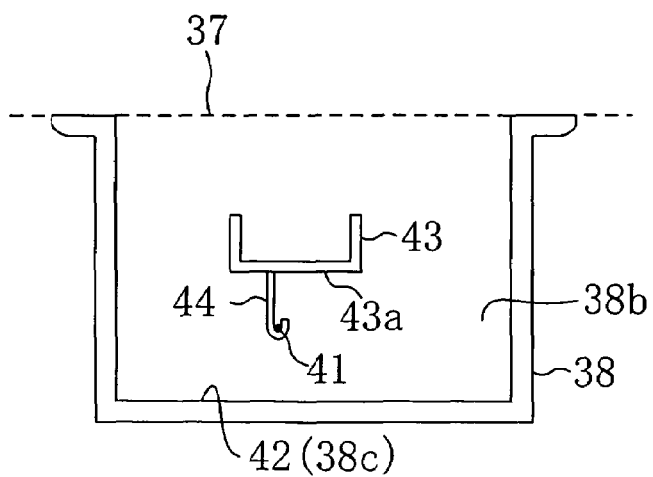

The discharge electrodes (41) are linear or rod-shaped and arranged behind the corrugated members (38). As shown in an enlarged perspective view of the discharge device (40) of FIG. 3A, the discharge electrodes (41) are supported by electrode holders (43) extending in the vertical direction in rear open areas (38b) of the corrugated members (38). Each of the electrode holders (43) is substantially U-shaped when viewed in horizontal section and provided at a desired location with a forwardly bent support plate (fixing member) (44). Each of the linear or rod-shaped discharge electrodes (41) is supported by the edge portion of the support plate (44) which is crimped to hold the discharge electrode (41) (see a horizontal section of the discharge device in FIG. 3B). In this way, the upper and lower ends of the discharge electrode (41) protrude from the support plate (44) in the vertical direction. In the present embodiment, the discharge electrodes (41) are made of tungsten.

The counter electrodes (42) are formed by parts of the corrugated members (38) which have first surfaces (rear surfaces) (38c) defining the rear open areas (38b) in which the discharge electrodes (41) are thus arranged. The first surfaces (38c) function as electrode surfaces opposing to the discharge electrodes (41). Thus, the discharge electrodes (41) protruding from the support plates (44) are arranged substantially parallel to the electrode surfaces of the counter electrodes (42). Further, spacers (46) are arranged at the upper and lower ends of each of the counter electrodes (42) to fit between the counter electrode (42) and the electrode holder (43). In this embodiment, the spacers (46) are made of insulative porcelain. The spacers (46) keep a certain distance (B) between the tips of the discharge electrodes (41) and the counter electrodes (42).

The electrostatic filter (33) is positioned at the downstream of the discharge device (40). The electrostatic filter (33) collects relatively small dust electrified by the ionization part (32) on the upstream surface and supports a photocatalyst (photosemiconductor) on the downstream surface. The photocatalyst further activates highly reactive substances (active species such as electrons, ions, ozone and radicals) in low temperature plasma generated by discharge in the discharge device (40) to promote decomposition of the hazardous components and odorous components in room air. The photocatalyst is, for example, titanium dioxide, zinc oxide, tungsten oxide or cadmium sulfide. The electrostatic filter (33) is a so-called pleated filter which is corrugated when viewed in horizontal section.

The catalytic filter (34) is arranged at the downstream of the electrostatic filter (33). The catalytic filter (34) is made of a base material of a honeycomb structure and a plasma catalyst supported on the surface of the base material. Like the above-described photocatalyst, the plasma catalyst further activates the highly reactive substances (active species such as electrons, ions, ozone and radicals) in the low temperature plasma generated by discharge in the discharge device (40) to promote decomposition of the hazardous components and odorous components in room air. The plasma catalyst may be a manganese-based catalyst, a noble metal-based catalyst or a catalyst of these kinds added with an adsorbent such as activated carbon.

Running Operations

During the operation of the air purifier (10), the centrifugal air blower (26) is working and room air representing a gas to be treated is passed through the air passageway (25) in the casing body (21). In this state, a high voltage is applied from the power source (45) to the ionization part (32) and the discharge device (40).

When room air is introduced into the casing body (21), relatively large dust in the air is collected by the prefilter (31). The room air passed through the prefilter (31) flows toward the ionization part (32). As a result of discharge caused between the ionization wires (35) and the counter electrodes (36) in the ionization part (32), relatively small dust in the room air is electrified. The room air containing the electrified dust flows toward the electrostatic filter (33) and the electrified dust is collected by the electrostatic filter (33).

In the discharge device (40), low temperature plasma has been generated by streamer discharge between the discharge electrodes (41) and the counter electrodes (42). The low temperature plasma generated by the discharge device (40) flows downstream together with the room air.

The low temperature plasma contains highly reactive substances (active species). Upon contact with the room air, the highly reactive substances decompose hazardous components and odorous components contained in the room air. When the active species reach the electrostatic filter (33), they are further activated by the photocatalyst supported on the electrostatic filter (33) to promote the decomposition of the hazardous and odorous components in the room air. Further, the active species diffuse entirely into the air passageway (25) in the passage of the active species through the electrostatic filter (33) and then reach the catalytic filter (34). When the active species reach the catalytic filter (34), they are much more activated to decompose the hazardous and odorous components to a greater extent.

In this manner, the room air is purified by removing the dust, hazardous components and odorous components, and then emitted outside from the air blowout opening (24) by the centrifugal air blower (26).

Effects of Embodiment

According to this embodiment, a discharge device (40), an electrostatic filter (33) and a catalytic filter (34) are arranged in sequence from the upstream side of the flow of room air. Therefore, active species contained in plasma generated by the discharge device (40) sufficiently diffuse into the air with the air flow in the passage of the active species through the electrostatic filter (33) and then reach the catalytic filter (34). In view of the above, the entire face of the catalytic filter (34) effectively works, resulting in the achieved satisfactory air purifying performance.

Since the elimination of fungi and the inactivation of allergens are carried out in the passage of active species through the electrostatic filter (33), this does not cause the problem that fungi and allergens may scatter into the air during maintenance, such as the replacement of the electrostatic filter (33). Furthermore, since dust in the air is removed immediately before the catalytic filter (34), this can certainly prevent the catalytic activity from being deteriorated due to the adhesion of dust to the catalytic filter (34).

Other Embodiments

In addition to the embodiment described above, the present invention may be configured as follows.

For example, in the foregoing embodiment, the electrostatic filter (33) is used as a dust collecting part. Alternatively, an electrical dust collecting member, such as a duct collecting plate (an electrode plate), or any other dust collecting filter may be used.

In the foregoing embodiment, the provision of the ionization part (32) allows the electrification of relatively small dust in the air, and the electrified dust is collected by the electrostatic filter (33). However, the ionization part need not necessarily be provided. Also in the case where no ionization part is provided, dust can be ionized by the discharge device (40). As a result, the electrostatic filter (33) can exhibit a high dust collecting effect by utilizing the ionization of dust using the discharge device (40). Furthermore, since with this structure the discharge device (40) is utilized as a discharge part for electrical dust collection, an air purifier combining an air purifying function using plasma with an air purifying function using electrical dust collection can be made compact.

Furthermore, in the foregoing embodiment, the catalytic filter (34), whose base material supports thereon a plasma catalyst, such as a catalyst of the manganese family, a catalyst of the precious metal family etc., is disposed downstream of the discharge device (streamer discharge part) (40). However, instead of using the catalytic filter (34), an adsorptive processing member, whose base material supports thereon an adsorbent, such as activated carbon, zeolite etc., may be disposed downstream of the discharge device (40). Such an adsorptive processing member adsorbs odorous components and hazardous components in the air and thus functions as a reaction field of active species to promote the treatment of air. Such an adsorptive processing member represents the catalytic part herein.

It should be noted that the foregoing embodiments are merely examples which are essentially preferred and are not intended to limit the present invention or the extent of applications and uses thereof.

INDUSTRIAL APPLICABILITY

As described above, the present invention is useful for an air purifier including a streamer discharge part that generates plasma by streamer discharge, a catalytic part that promotes the treatment of air using active species contained in the plasma and a dust collecting part that collects dust in the air.

The invention claimed is:

1. An air purifier comprising:
    an ionization part (32);
    a streamer discharge part (40) generating plasma by streamer discharge;
    a catalytic part (34) promoting the treatment of air using active species contained in the plasma; and
    a dust collecting part (33) collecting dust in the air,
    wherein the ionization part (32), the streamer discharge part (40), the dust collecting part (33) and the catalytic part (34) are arranged in sequence from the upstream side of the air flow, and
    the dust collecting part (33) is formed of an electrical dust collecting member.

2. The air purifier of claim 1, wherein the dust collecting part (33) is formed of an electrostatic filter.

* * * * *